United States Patent
Ahn et al.

(10) Patent No.: US 8,312,083 B2
(45) Date of Patent: Nov. 13, 2012

(54) SYSTEM AND METHOD FOR SHARING SEARCH RESULT USING MESSENGER

(75) Inventors: Jung-Eun Ahn, Youngin-si (KR); Jae-Gwang Lee, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 621 days.

(21) Appl. No.: 11/722,794

(22) PCT Filed: Dec. 23, 2005

(86) PCT No.: PCT/KR2005/004497
§ 371 (c)(1),
(2), (4) Date: Jun. 25, 2007

(87) PCT Pub. No.: WO2006/071030
PCT Pub. Date: Jul. 6, 2006

(65) Prior Publication Data
US 2008/0140779 A1    Jun. 12, 2008

(30) Foreign Application Priority Data

Dec. 28, 2004 (KR) .......................... 10-2004-0113866

(51) Int. Cl.
*G06F 15/16* (2006.01)
*G06F 15/173* (2006.01)
(52) U.S. Cl. .................. 709/205; 709/217; 709/225
(58) Field of Classification Search .............. 709/205, 709/225, 217; 707/3, 5, 10
See application file for complete search history.

(56) References Cited

U.S. PATENT DOCUMENTS

| | | | |
|---|---|---|---|
| 6,625,595 B1 * | 9/2003 | Anderson et al. | 707/3 |
| 6,745,178 B1 * | 6/2004 | Emens et al. | 707/3 |
| 7,200,590 B2 * | 4/2007 | Everett-Church et al. | 707/3 |
| 2004/0152477 A1 * | 8/2004 | Wu et al. | 455/466 |
| 2005/0234885 A1 * | 10/2005 | Szeto et al. | 707/3 |

FOREIGN PATENT DOCUMENTS

| | | |
|---|---|---|
| KR | 10-2001-0046821 | 6/2001 |
| KR | 10-2001-0086808 | 9/2001 |
| KR | 10-2001-0103277 | 11/2001 |
| KR | 10-2002-0046370 | 6/2002 |

* cited by examiner

*Primary Examiner* — Peter Shaw
(74) *Attorney, Agent, or Firm* — H.C. Park & Associates, PLC

(57) ABSTRACT

Disclose is a method and system for sharing search result using messenger. A messenger client generates search request information and receives web page data corresponding to the search request information. A search server receives the search request information from the messenger client and performs a search for one or more keywords included in the search request information to transmit search result page data to the messenger client. When the search result page is transmitted from the search server, a layer coupled to a conversation window is formed to display the search result page and allow users to share the information on web page corresponding to the search results when requested.

15 Claims, 19 Drawing Sheets

SYSTEM AND METHOD FOR SHARING SEARCH RESULT USING MESSENGER

CROSS-REFERENCE TO RELATED APPLICATION

This application is a U.S. national phase application of PCT International Application No. PCT/KR2005/004497, filed Dec. 23, 2005, which claims priority of Korean Patent Application No. 2004-0113866, filed Dec. 28, 2004, the contents of which are incorporated herein by reference in their entirety.

FIELD OF THE INVENTION

The present invention relates to a messenger, more particularly to sharing information using a messenger.

BACKGROUND

Use of a messenger that transmits and receives instant messages is increasing with the messenger becoming one of main communication means. A messenger can also transmit messages document files, picture files, etc. besides general text messages through a computer communicated in real time.

When users talk about a specified issue through the messenger, many users get information about the issue through web searching. For example, when users talk of recent movies, users often get information about the recent movies through web searching and talk about search results.

When users search to get information about issue associated with talking, users generally execute a web browser and connect to a search service homepage in order to search, which is inconvenient to users.

Further, as search results are displayed in the web browser, users can not share the search results with conversation partners. Therefore, users have to copy the address of the search result page and provide the copied address to the conversation partner. Furthermore, the conversation partner that received the copied address also has to execute the web browser to request the page corresponding to the copied address.

Conventionally, a buddy list window has provided a search keyword input interface. When a search keyword is inputted in the search keyword input interface, a web browser is executed and search results are displayed in the executed web browser.

However, it does not make much difference from executing a web browser and inputting a search key word in the search service homepage.

Moreover, because the search keyword input interface is included in the window for displaying a buddy list, users have to select the buddy list window and input keywords to the search keyword input interface. Further, sharing the search results with a conversation partner is still impossible because the search results are displayed in the web browser.

SUMMARY

In order to solve above-mentioned problems of the prior art, embodiments of the present invention provide a method and system by which users can more conveniently share search results while messenger chatting.

Further, other embodiments of the present invention provide a method and system by which users can more conveniently request a search through a messenger conversation window while messenger chatting.

Furthermore, embodiments of the present invention provide a method and system that allows users not only to see search results, but also to have a conversation with a messenger by displaying search results on the messenger.

Moreover, other embodiments of the present invention provide a method and system by which a web page displayed on a messenger of a certain user can also be displayed on a messenger of a conversation partner.

According to an embodiment of the present invention, a system for sharing search results comprises at least one messenger client where a messenger is installed for generating search request information when a user requests to search through the messenger and receiving web page data corresponding to the search request information, and a search server for receiving the search request information from the messenger client and performing search by keyword included in the search request information to transmit search result page data to the messenger client. A conversation window of the messenger provides an interface by which a user can request search by inputted text, and the messenger displays search results by forming a layer coupled to the conversation window when the search result page is transmitted from the search server, the messenger information on the web page displayed in the layer is transmitted to a client of a conversation partner when a user requests to share the search results.

According to another embodiment of the present invention, a method for sharing search results using a messenger comprises generating search request information for a specified keyword when a user requests to search for the specified keyword, transmitting the search request information to a search server, displaying a search result page through a layer coupled to a messenger conversation window when the search result page is received from the search server, and transmitting to at least one of conversation partners the information on web page displayed in the layer if the user in conversation requests to share the search results with at least one of conversation partners. In the messenger, the conversation window provides a user interface by which search by text inputted in the conversation window can be requested.

According to still another embodiment of the present invention a system for providing search result sharing service through a messenger comprises an instant message transmission system for managing state of messenger users and relaying messages between users, receiving search request information transmitted by the messenger installed in a user client and generating a search result page corresponding to a keyword included in the search request information, and transmitting the generated search result page to the user client that requested search. A conversation window of the messenger installed in the user client provides an interface by which a user can request search by inputted text, and the messenger displays search results by foiling a layer coupled to the conversation window when the search result page is transmitted from the search server, wherein the conversation window or the search result page provides a user interface by which sharing of the search result can be requested, and information on the search result page is transmitted to a client of a conversation partner through the instant message transmission system when sharing of the search result is requested.

According to still another embodiment of the present invention, a messenger user interface for sharing search results between messenger users comprises a conversation window for inputting messages and displaying transmitted/received messages, a search request button for requesting a search by an inputted keyword, a layer coupled to the conversation window for displaying a search result page when the search result page is transmitted from a search server in response to the search request, a sharing request button for requesting sharing of the web page information displayed in the layer, the sharing request button being provided by the web page displayed in the layer or the conversation window, wherein the layer is formed using API having a web browser module.

DETAILED DESCRIPTION

Hereinafter, embodiments of the present invention will be described with reference to the accompanying drawings.

Figure 1:
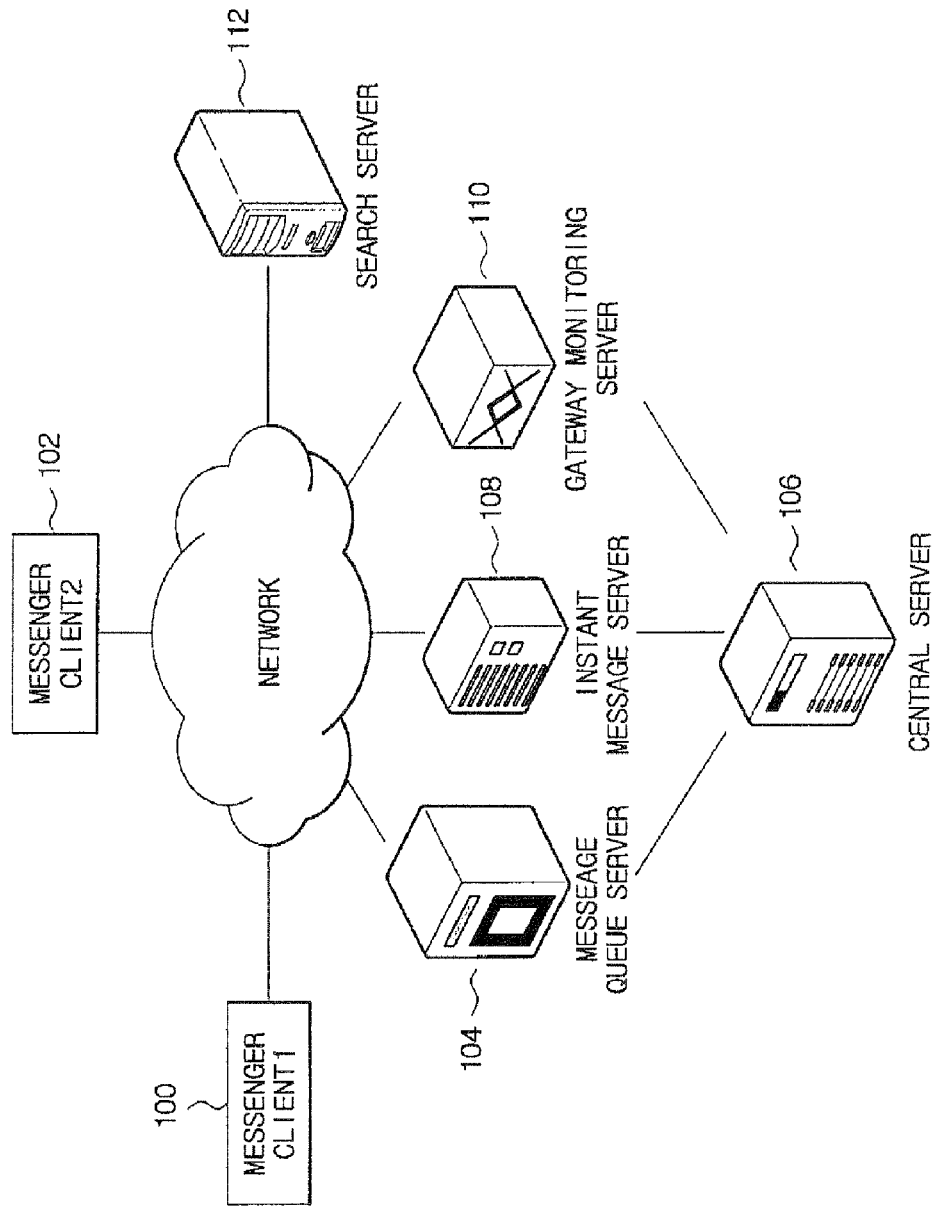
FIG. 1 illustrates a system for sharing search results using a messenger according to an embodiment of the present invention.

FIG. 1 illustrates a system for sharing search results using messenger according to an embodiment of the present invention. Referring to FIG. 1, the system for sharing search results using a messenger comprises a plurality of messenger clients 100, 102, a message queue server 104, a central server 106, an instant message server 108, a gateway monitoring server 110, and a search server 112.

In FIG. 1, the messenger clients 100, 102 transmit and receive instant messages through a messenger and a messenger program is installed on the messenger clients for transmitting/receiving instant messages. Further, the messenger clients of this embodiment of the present invention provide an interface by which users can transmit search request information through a messenger to the search server 112.

Messenger clients may include all kinds of digital data processing devices that can operate messenger applications and communicate through network such as a general PC, a PDA, a note book, a mobile phone, and so on. When messages are transmitted and received through the messenger, instant messages from the messenger client1 100 is transmitted to the message queue server 104 though network.

Herein, the network may include wire networks such as the Internet and wireless networks such as mobile communication network and a wireless internet network. The message queue server 104 stores messages in the queue when messages are transmitted, and derives messages by a FIFO (First Input and First Output) method. The message queue server 104 performs business logic for the derived messages and transmits the message to the central server. The business logic performed by the message queue server 104 may include filtering prohibited words (for example, insults) and determining which packet is transmitted to a server.

The central server 106 controls message transmission. The central server 106 manages connection of messenger clients, and processes messages and request information transmitted from clients. When general messages are transmitted to the central server, the central server transmits the received messages to instant message server 108.

The instant message server 108 manages instant messaging sessions of messenger clients and relays a message packet between messenger clients. The instant message server 108 receives a message packet form the central server and relays it to the messenger client2 102 that is a receiver.

The gateway monitoring server 110 processes connection requests when messenger clients connect to the messenger system and provides address information of the central server. When users log in initially, the log-in request is transmitted to the gateway monitoring server 110, the gateway monitoring server 110 processes the log-in request and the processed log-in information is transmitted to the central server 106.

The search server 112 receives the search request information from the messenger clients and performs searching by the keyword included in the search request information. Further, the search server 112 generates a web page for search results and provides it to the messenger client that requested the search.

According to an embodiment of the present invention, messenger clients can transmit the search request information including an identifier for indicating that the search request is from a messenger to the search server. In addition, the search server 112 performs the search, generates a web page that is adequate for a messenger display configuration, and transmits it to the messenger client that requested the search.

According to another embodiment of the present invention, an identifier for indicating that search request is from the messenger may not be included in the search request information, and the search server may generate a general search result web page to the messenger client.

When the messenger client1 100 transmits the search request information to the search server 112, the messenger client1 100 receives the search result web page from the search server 112. A layer that is coupled to a conversation window of the messenger is formed in order to display the search result web page. That is, a web browser is not necessarily executed in order to display the search results since the layer coupled to a messenger conversation window can display the search results.

A user interface by which sharing of the search results with the messenger client2, i.e., the conversation partner, can be requested so that the displayed web page or the messenger conversation window is shared. The user of the messenger client1 100 requests sharing of the search results using the user interface provided by the displayed web page or the conversation window.

When the messenger client1 100 requests sharing of the search results using the user interface, the information on the displayed web page is provided to the messenger client2 102, the conversation partner, and the user of the messenger client2 102 can see the same search result web page through the layer coupled to the conversation window.

Therefore, the user of the messenger client1 100, and the user of the messenger client2 102 can share the search results. That is, according to the present invention, users need not exchange URL information in order to chat about a specified issue.

Figure 2:
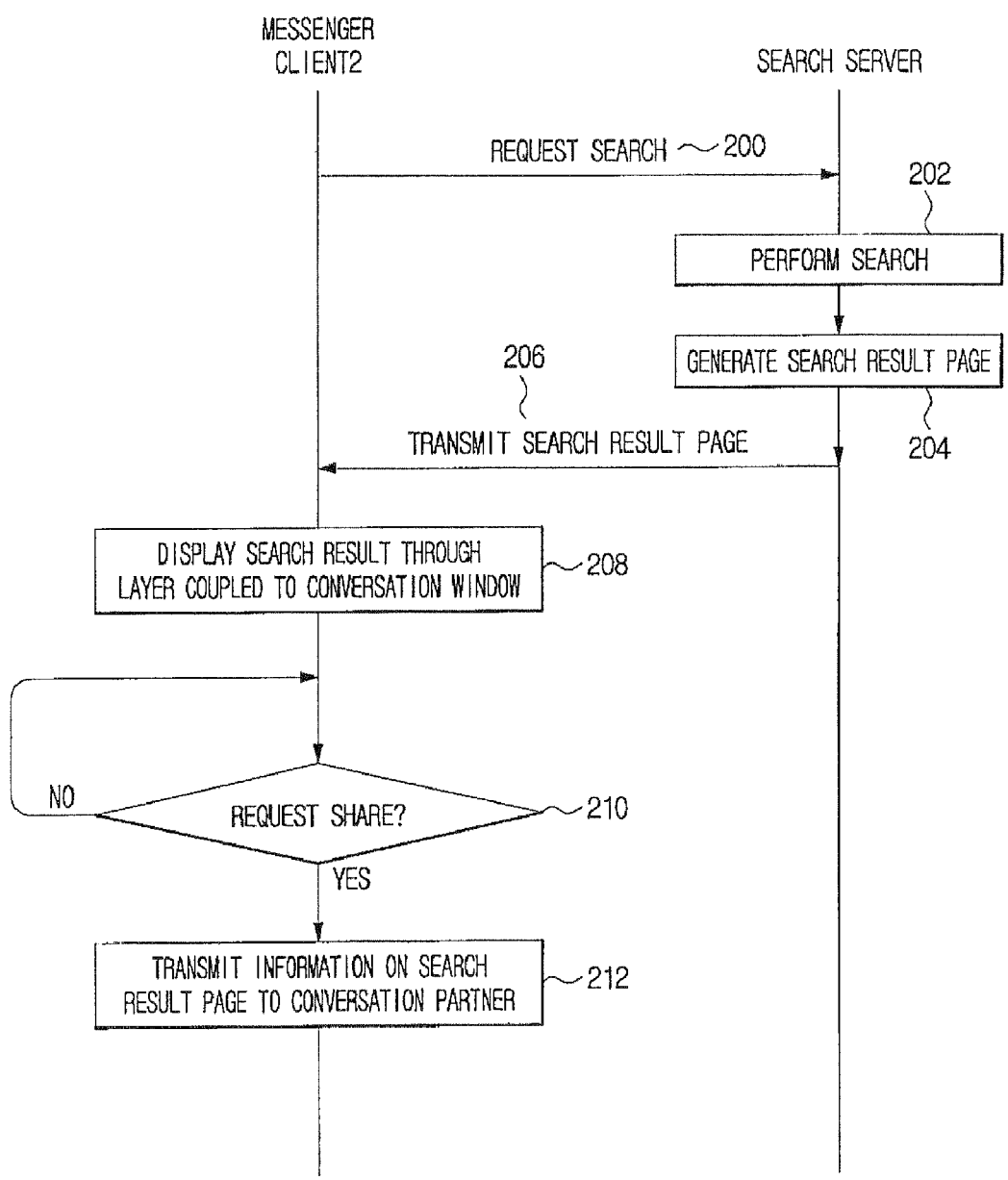
FIG. 2 illustrates a flow chart of a method for sharing search results by a messenger according to another embodiment of the present invention.

FIG. 2 illustrates a flow chart of a method for sharing search results by a messenger according to another embodiment of the present invention. Referring to FIG. 2, the messenger client transmits search request information using the search request interface included in the conversation window in step 200. The search request information includes a search keyword and users can input a keyword in a general conversation window.

The search server receives the search request information from the messenger client, and performs searching by the keyword included in the search request information in step 202. As a search method by the specified keyword is a well known technology, the detailed method will not be described here. Additionally, various other well known search methods may be applied in other embodiments of the present invention.

The search server generates a web page for the search results, the web page may be in the form of an HTML document or other types of documents in step 204. As described above, the identifier for indicating that the search request is from the messenger may be included in the search request information so that the search server generates a web page that is convenient for search result sharing between messenger clients, unlike some general web pages. The web page that is convenient for the search result sharing is described later. The identifier for indicating that search request is from the messenger may not be included in the search request information, In this case, the search server generates the same web page that is generated when a search request by a web browser is transmitted.

When web page generation is completed, the search server transmits web page data to the messenger client in step 206. When the messenger installed in the messenger client receives the search result page, a layer coupled to the conversation window is formed. An example of the layer coupled to the conversation window and method for forming the layer is described below in reference to another figure. The search result page in the form of HTML is displayed in the layer in step 208.

A user interface by which users can request sharing of the search results is included in the messenger conversation window or the displayed web page, and it is determined if the search result sharing is requested through the search result sharing interface in step 210. When the search result sharing is requested, the messenger client transmits information on the displayed web page to the client of a conversation partner in step 212.

When there are a plurality of conversation partners, information on the displayed web page is transmitted to the clients of the plurality of conversation partners. When the client of the conversation partner receives information on the displayed web page in the layer, the layer coupled to the conversation window is also formed in the client of the conversation partner. The search result page is also displayed in the layer using the information from the client that requested the search result sharing.

Figure 3:
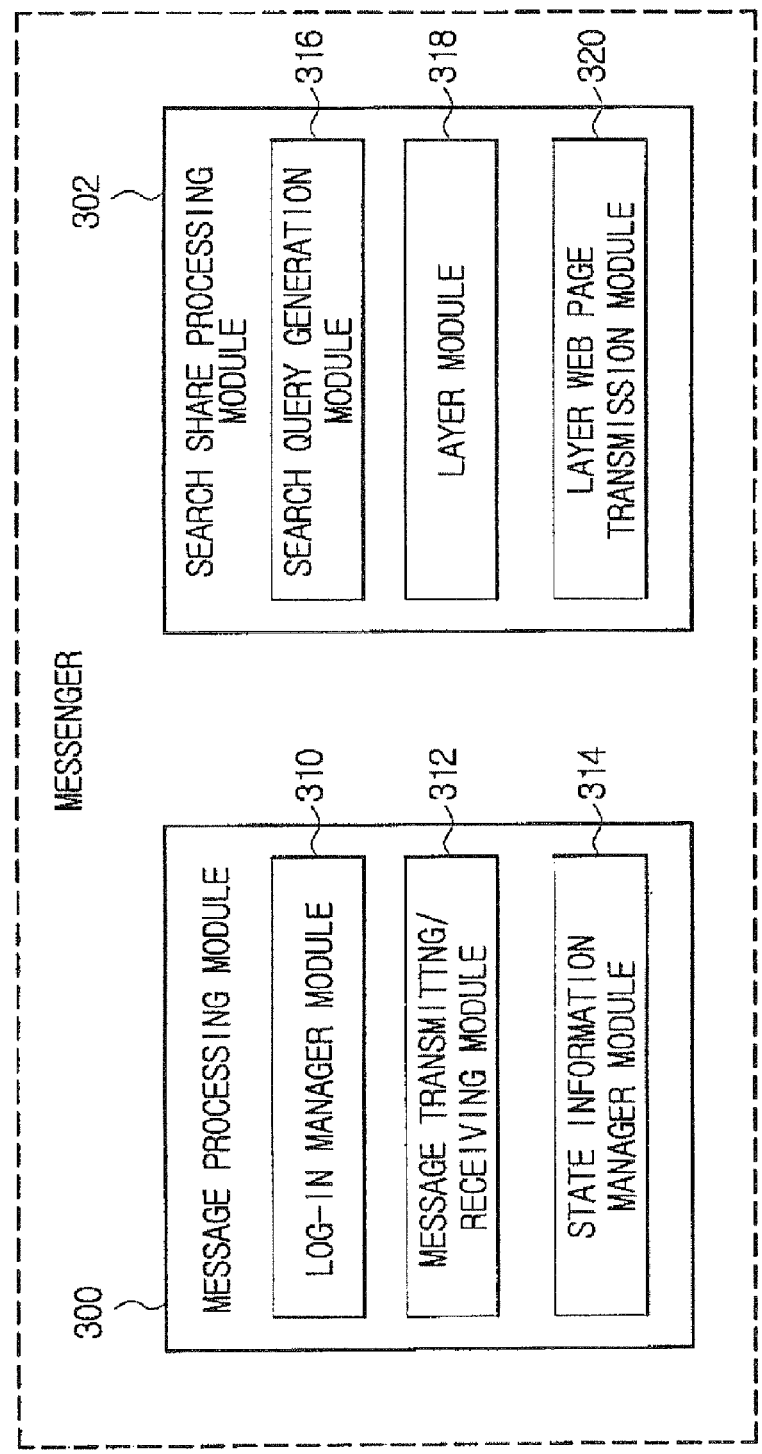
FIG. 3 illustrates a messenger module according to still another embodiment of the present invention.

FIG. 3 illustrates a messenger module according to another embodiment of the present invention. Referring to FIG. 3, the messenger according to this embodiment of the present invention may comprise a message processing module 300 including a log-in manager module 310, a message transmitting/receiving module 312, and a state information manager module 314. The messenger may further include a search result share processing module 302 including a search query generation module 316, a layer module 318, and a layer web page transmission module 320.

In the message processing module 300, the log-in manager module 310 processes log-in request from users. The log-in manager module 310 transmits the log-in request information including a user ID and a user password to the gateway monitoring server when a user requests log-in. In response, the log-in manager module 310 receives log-in response information from the gateway monitoring server. When a log-in request is appropriate, state information of users in a messenger buddy list is provided and the messenger buddy list including state information is displayed in the messenger.

The message transmitting/receiving module 312 transmits a message from the user to the message queue server and receives a message transmitted through the instant message server to display the message.

The state information manager module 314 provides state change information when the state of the messenger user is changed. For example, when a user does not use a computer for more than a predetermined time, the state information manager module 314 provides information that the corresponding user is off the seat. The central server transmits state change information to the users who are buddies of the user whose state was changed.

In the search result share processing module 302, the search query generation module 316 generates search request information to be transmitted to the search server when a user requests a search through the messenger. According to this embodiment of the present invention, users can request a search through the messenger conversation window, and the search query generation module 316 generates search request information corresponding to search keywords and transmits them to the search server.

Figure 5:
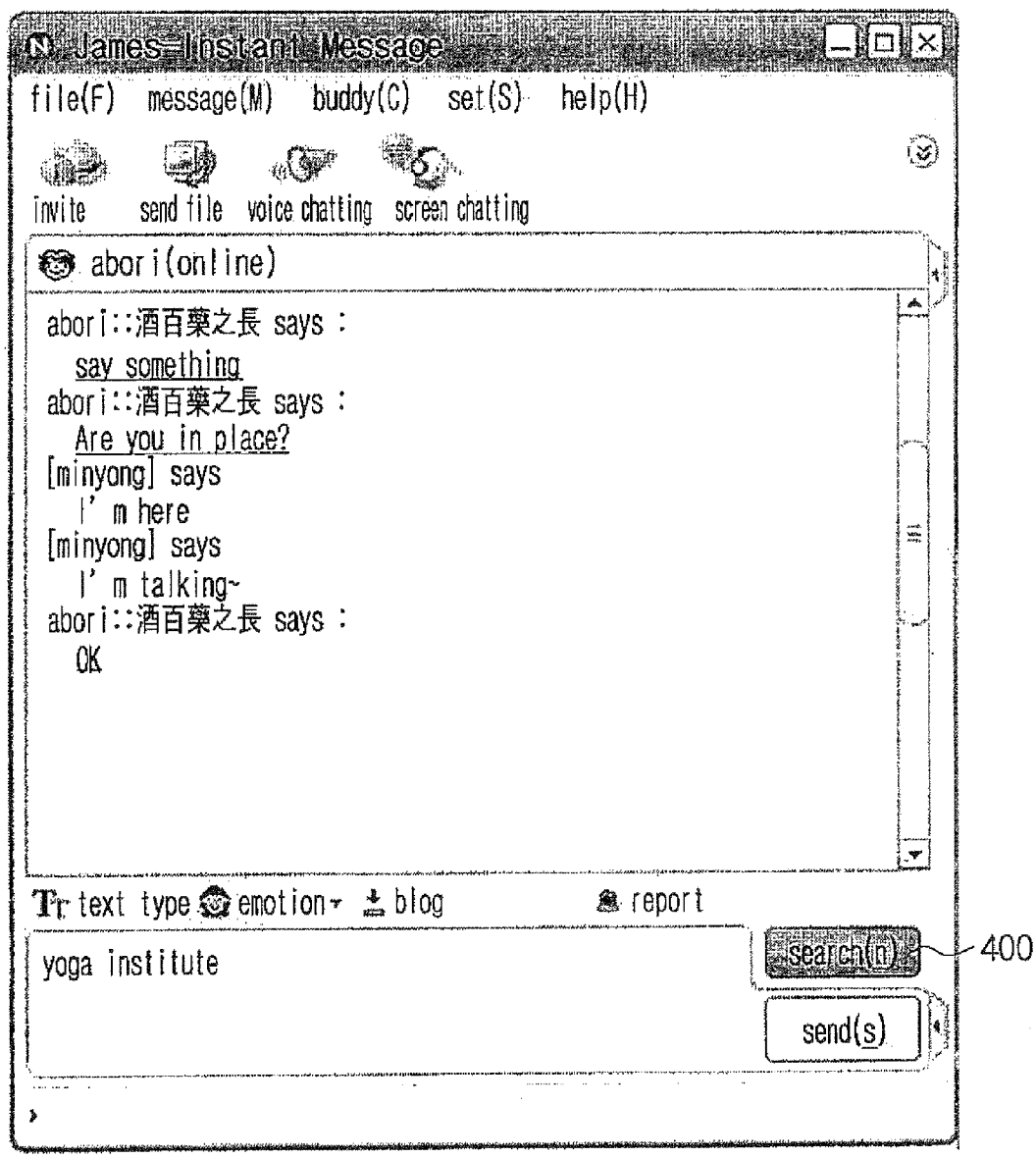
FIG. 5 illustrates an example of a messenger conversation window according to an embodiment of the present invention.

FIG. 5 illustrates an example of a messenger conversation window according to an embodiment of the present invention. Referring to FIG. 5, a search button 400 is provided above the message send button. After inputting text in the conversation window, if a user presses an enter key or clicks a send button, a general message transmission is performed.

If a user clicks the search button 400 after inputting text, the general message transmission is not performed but the search query generation module generates search request information.

In conventional arts, a search interface, by which a user can input a search keyword and request a search, was provided in the lower part of window that displays a buddy list. Therefore, if a user wants to search while chatting, the user had to select a window that displays a buddy list and input a search keyword. However, according to the present invention, a search keyword can be inputted in the conversation window and a user interface by which the user can request a search more conveniently is provided in the conversation window, thus allowing users to request a search.

The layer module 318 displays a received search result page when the search server transmits a search result page. According to the present invention, when the search result page is transmitted, the layer coupled to the messenger conversation window is formed.

Figure 6:
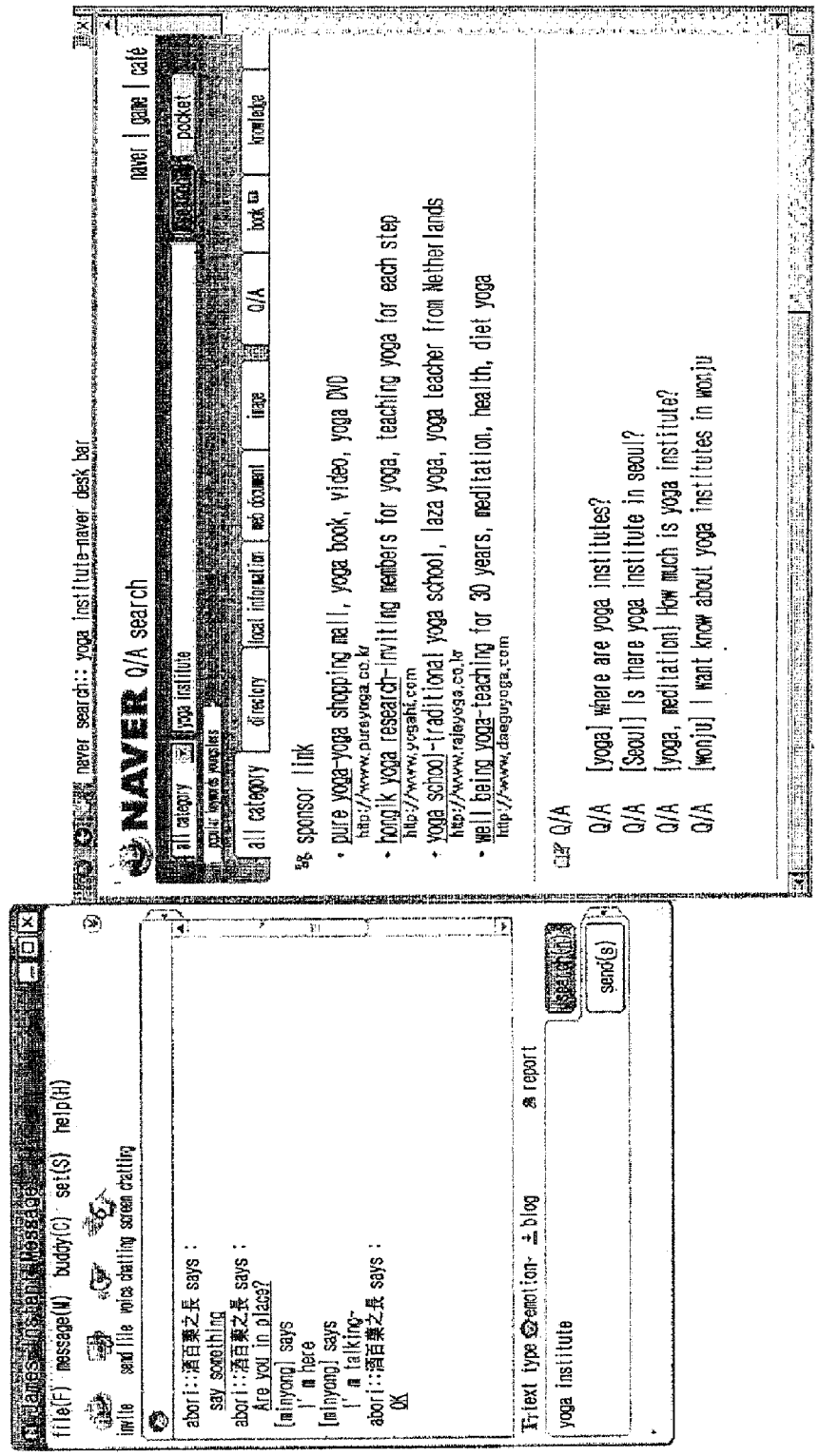
FIG. 6 illustrates an example of a layer coupled to the messenger conversation window for displaying a search result page.

FIG. 6 illustrates an example of a layer coupled to the messenger conversation window for displaying a search result page.

As shown in FIG. 6, a layer coupled to the side of the conversation window can be formed. As the layer is coupled to the conversation window, users can see the conversation window and the web page displayed in the layer at the same time.

In order to display an HTML format web page through the layer, API (Application Program Interface) having HTML display function of the web browser is used.

Companies providing the web browser generally provide an API having HTML display functionality of a web browser, and the layer, which can display the HTML format web page, can be designed using the API.

The layer web page information transmission module 320 transmits information on the web page displayed in the layer to a conversation partner when a messenger user requests to share the search results with conversation partner.

According to an embodiment of the present invention, the layer web page transmission module 320 transmits address information on the web page displayed in the layer. When the address information is transmitted, the messenger of the conversation partner client forms a layer and requests a web page corresponding to the received address to display the web page. For example, a search result page of which the key word is 'yoga institute' is displayed in the layer of the user that requested a search; the messenger of the user that requested the search transmits search query of which the keyword is 'yoga institute' to the conversation partner client. The messenger of the conversation partner client transmits the search query to the search server and downloads and displays the same web page.

According to another embodiment, the layer web page transmission module 320 can transmit the HTML data of the displayed web page in the layer to the conversation partner client. When the HTML data is transmitted, the messenger of the conversation partner client forms a layer and displays the HTML data in the formed layer.

According to another embodiment of the present invention, the entire HTML data of the displayed web page can be transmitted for sharing the search results; however, only part of the HTML data can be transmitted in other embodiments for sharing a portion of the search results.

Figure 4:
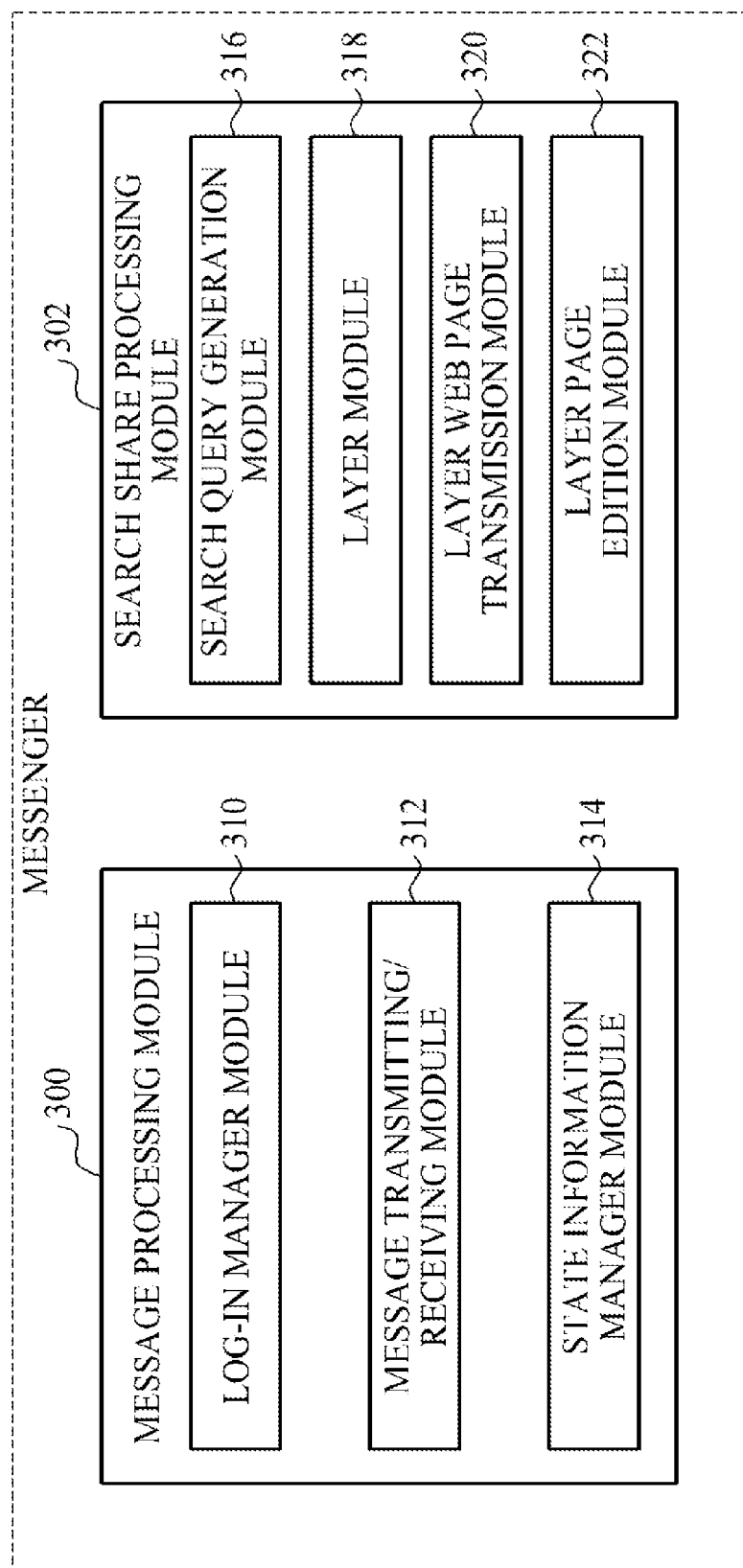
FIG. 4 illustrates a messenger module according to another embodiment of the present invention.

FIG. 4 illustrates a messenger module according to another embodiment of the present invention. Compared with FIG. 3, a layer page edition module 322 is further included. A user interface for requesting search result sharing can be provided through a conversation window or can be provided through a web page displayed in the layer. When a user interface for requesting the search result sharing is provided through the web page displayed in the layer, the layer page edition module 322 performs HTML editing for the displayed web page in order to form a button by which users can request search result sharing.

Figure 7:
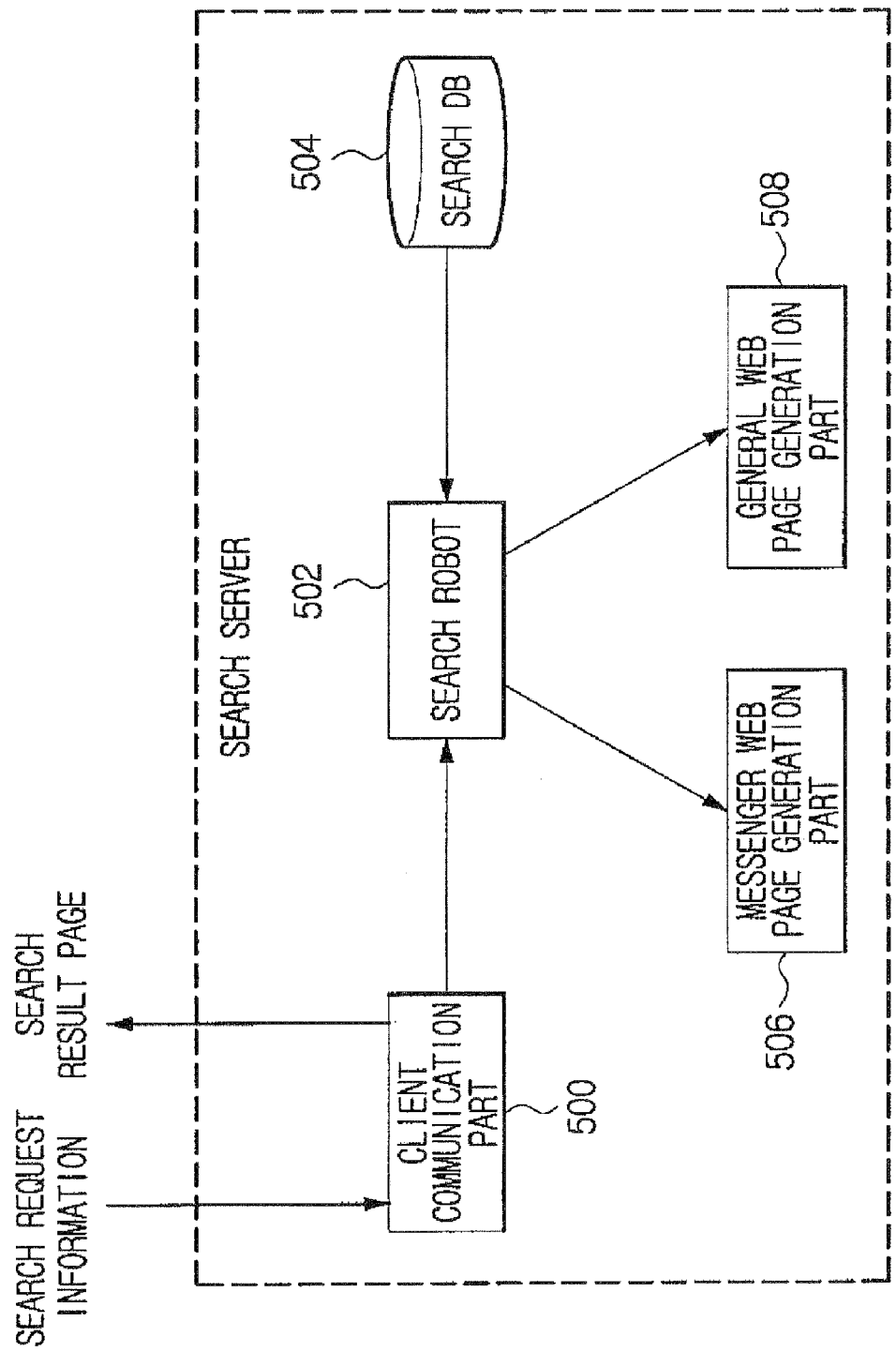
FIG. 7 illustrates a configuration of a search server according to another embodiment of the present invention.

FIG. 7 illustrates a configuration of a search server according to an embodiment of the present invention. Referring to FIG. 7, the search server according to this embodiment of the present invention may comprise a client communication part 500, a search robot 502, a search database 504, a messenger web page generation part 506, and a general web page generation part 508.

In FIG. 7, the client communication part 500 receives search request information from a client, and transmits a search result page corresponding to the search request information to the client. When the messenger client transmits a search query, the client communication part 500 receives the search query and delivers the search query to the search robot 502.

The search robot 502 performs a search by one or more keywords included in the search query using the search database 504. The search can be performed for various categories such as knowledge, news, web documents, and it would be obvious to those skilled in the art that various search methods can be used.

As described above, an identifier for indicating that the search request is from the messenger can be included in the search request information, the search server of FIG. 7 determines if the search request is from the messenger or a general web browser and generates a search result page depending on the determination. However, the search result page may be generated without determining if the search request is from the messenger or the general web browser.

When the messenger sends the search request information, the search robot 502 provides search results to the messenger web page generation part 506. When the web browser sends the search request information, the search robot 502 provides search results to the general web page generation part 508.

When the messenger sends the search request information, the messenger web page generation part 506 generates a web page for the search results. The size of the layer for displaying the search result in the messenger may be smaller than that of the web browser; thus, the messenger web page generation part 506 may generate a search result page with fewer search results than the general web page.

According to an embodiment of the present invention, the messenger web page generation part 506 generates the search result page having an interface by which users can request sharing of the search results.

Figure 8:
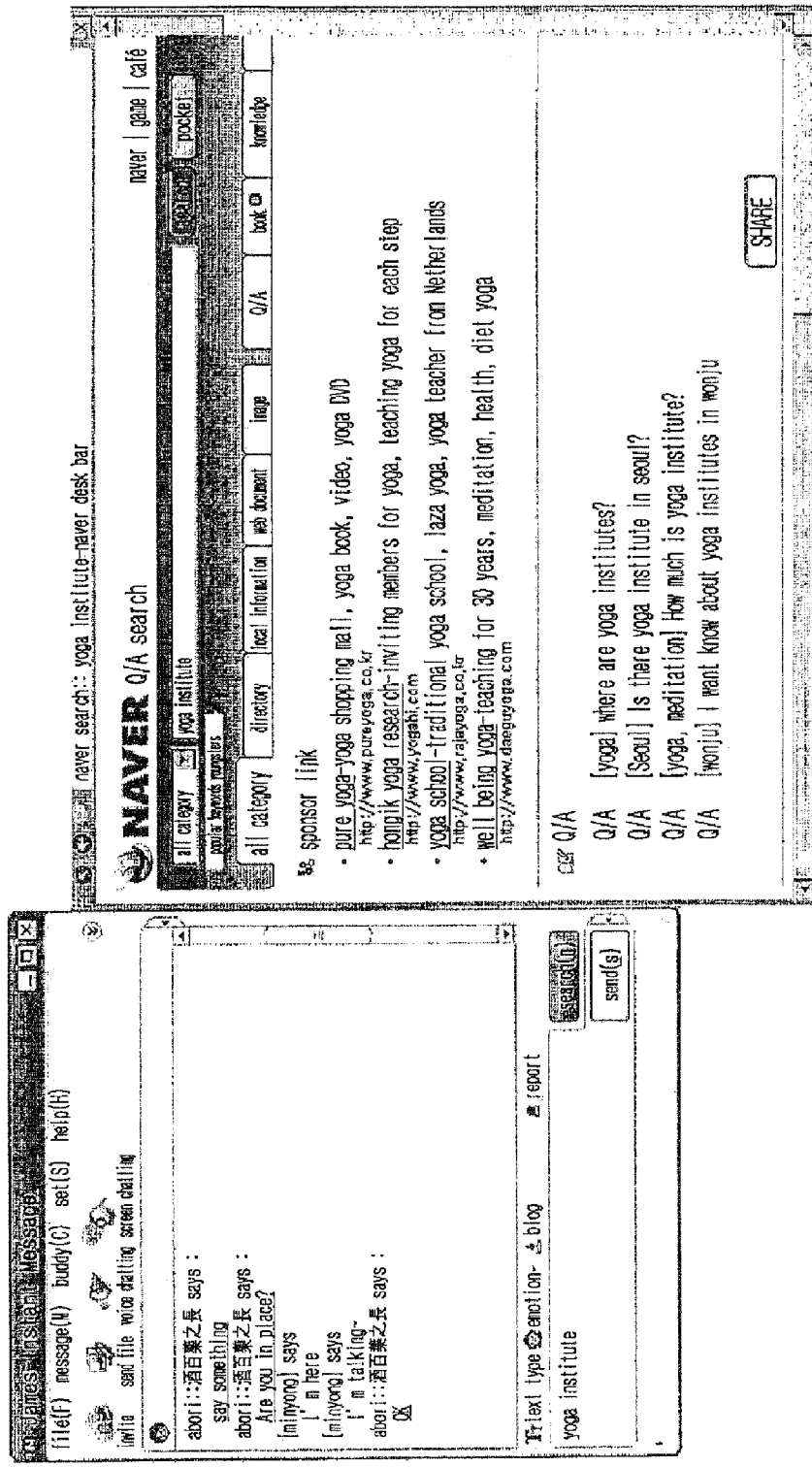
FIG. 8 illustrates an example of a web page having a share button displayed in a layer.

FIG. 8 illustrates an example of a web page having a share button displayed in a layer.

As shown in FIG. 8, the messenger web page generation part 506 generates a web page including a user interface by which users can request sharing of the search results as well as the search results.

According to another embodiment of the present invention, the messenger web page generation part 506 may generate a web page having an interface by which users can request sharing of the search results by a sort of the search results among search results displayed in the web page.

Figure 10:
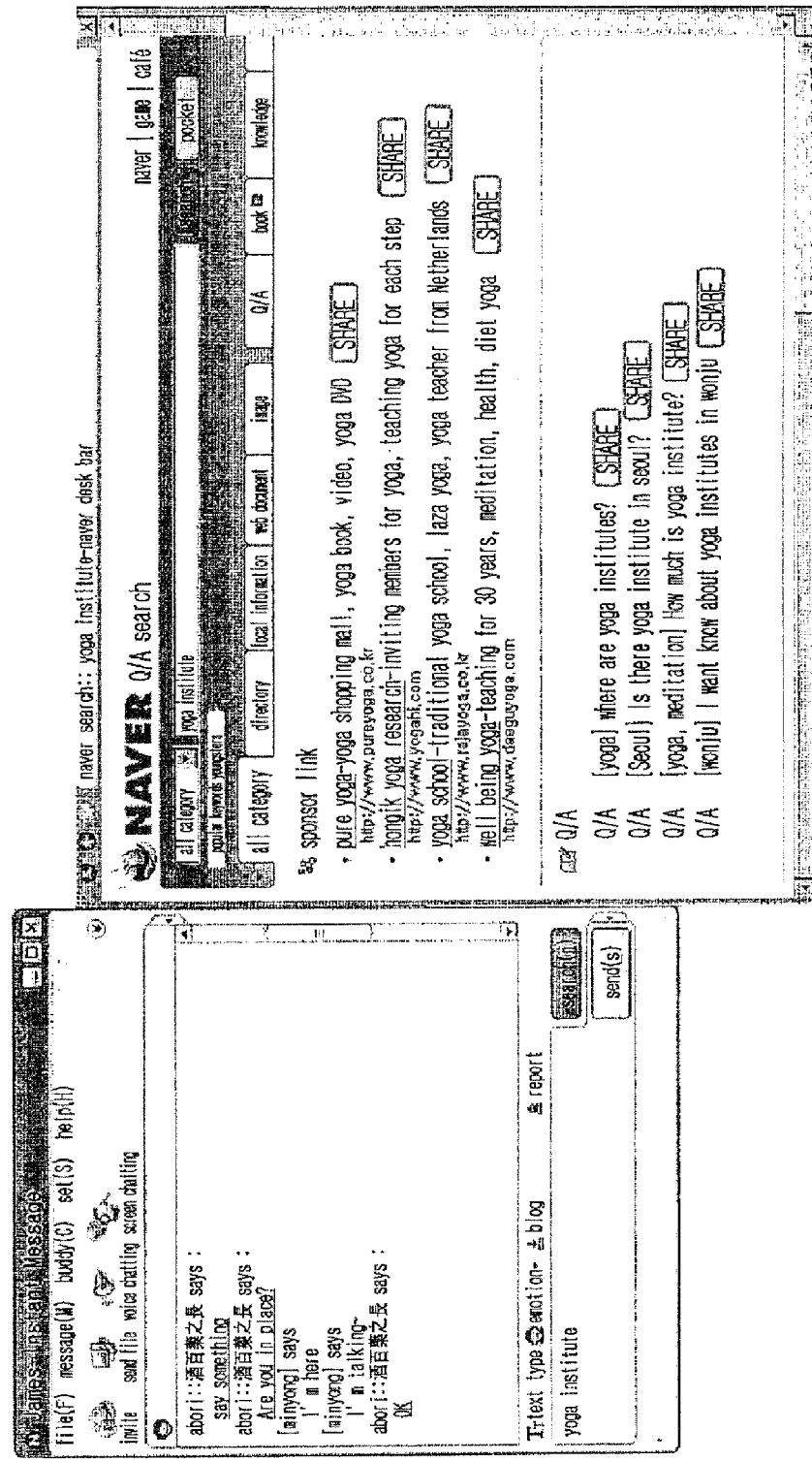
FIG. 10 illustrates an example of a web page having an interface by which users can request sharing for each search result.

FIG. 10 illustrates an example of a web page having an interface by which users can request sharing for each search result. As shown in FIG. 10, the messenger web page generation part 506 may generate a web page having a plurality of interfaces that are associated with each search result. In FIG. 10, when a user wants to share only 'pure yoga' information with a conversation partner among the search results for 'yoga institute', the user may click only the button associated with 'pure yoga' and the HTML information associated with the 'pure yoga' is transmitted to the conversation partner.

The search server may not generate a web page having an interface by which a user can request sharing of the search results. In this case, the interface, by which a user can request sharing of the search results, is provided in a conversation window.

Figure 9:
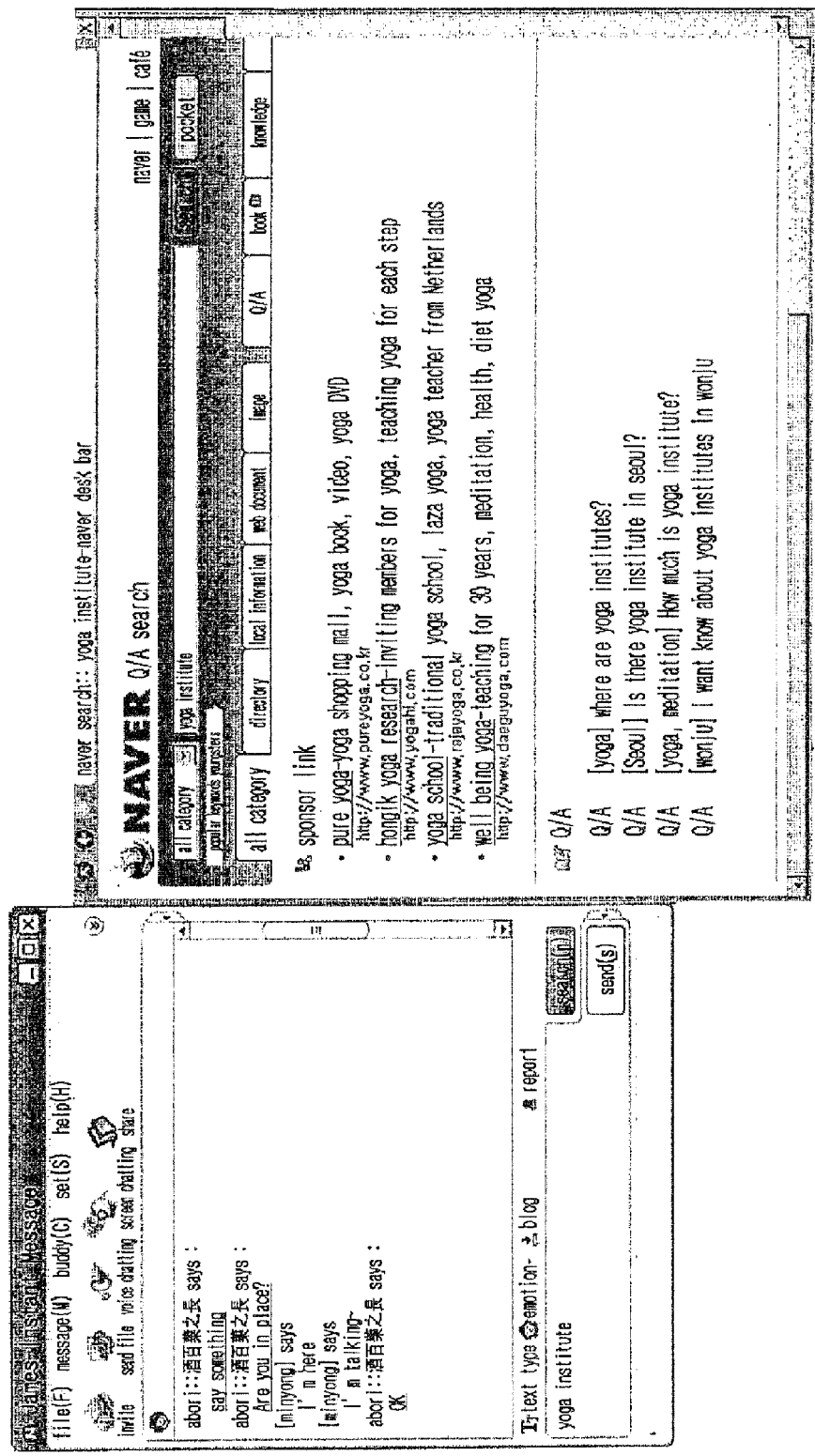
FIG. 9 illustrates an example of a user interface included in the messenger conversation window.

FIG. 9 illustrates an example of a user interface included in the messenger conversation window.

As shown in FIG. 9, the messenger web page generation part 506 may generate a web page including only search results and transmit the web page to the messenger client. In this case, users click a share button included in the conversation window in order to share the search results with the conversation partner and the web page information displayed in the layer is transmitted to the client of the conversation partner.

The interface for requesting sharing of the search results may be provided in various ways besides the interface shown in FIG. 8 to FIG. 10.

Figure 11:
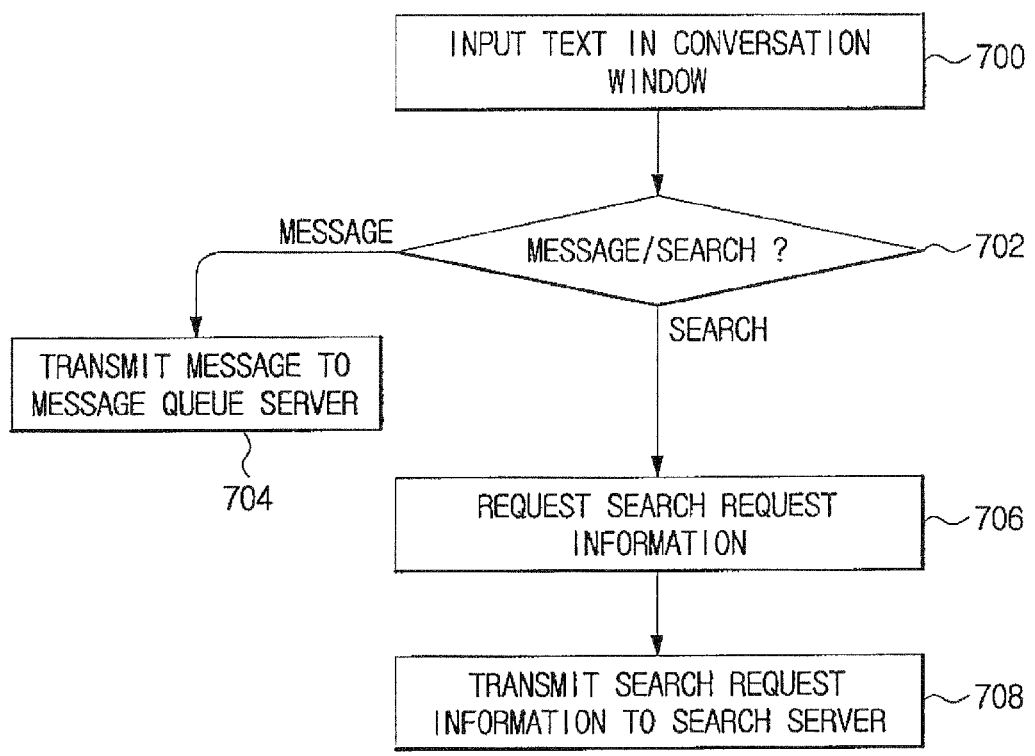
FIG. 11 illustrates a flow chart of a messenger operation for sharing of search results according to an embodiment of the present invention.

FIG. 11 illustrates a flow chart of messenger operation for sharing of search results according to an embodiment of the present invention.

Referring to FIG. 11, the messenger installed in a client receives text information inputted in a conversation window by a user in step 700. After text is inputted in the messenger conversation window, it is determined if there is a user request to send messages or search in step 702. When a user requests to send messages by the inputted text, the messenger transmits the inputted text message to the message queue server in step 704. When a user requests to search for the inputted text, the messenger generates search request information corresponding to the inputted text in step 706.

Figure 12:
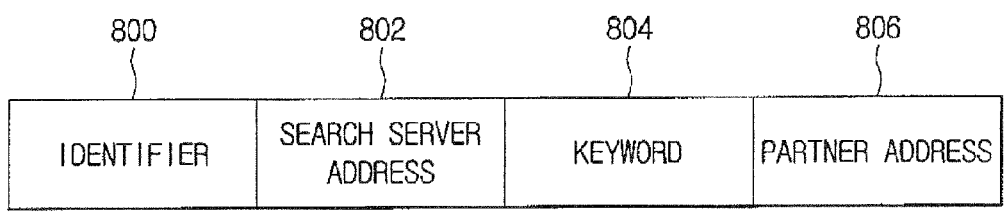
FIG. 12 to FIG. 14 illustrate examples of search request information generated by a messenger.
Figure 13:
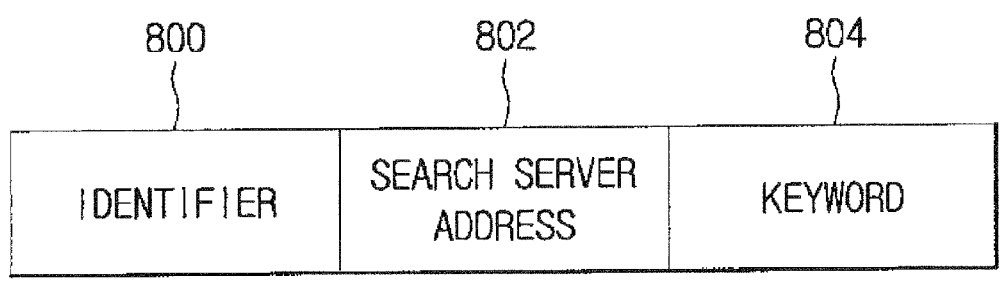
Figure 14:
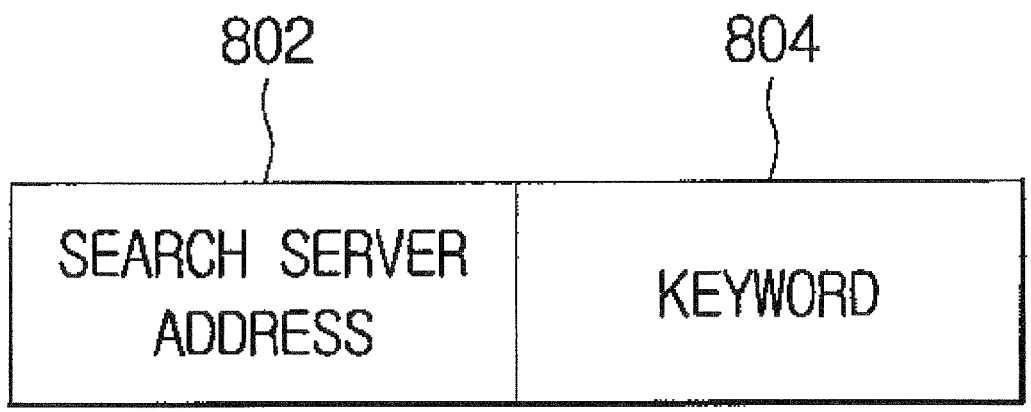

FIG. 12 to FIG. 14 illustrate examples of search request information generated by a messenger. Referring to FIG. 12, the messenger may generate search request information including an identifier 800, a search server address 802, a keyword 804, and a conversation partner address 806. The identifier 800 is for indicating that the search request is from the messenger. The identifier is predetermined between the messenger and the search server. The search server address 802 is the address of the search server where the search request information is to be transmitted and the search server address may be the URL information of the search server. The keyword 804 is text information inputted in the conversation window, and the conversation partner address 806 may be the IP address of a conversation partner. When there are a plurality of conversation partners, a plurality of addresses maybe included in the conversation partner address field 806. The conversation partner address 806 is used when the search server generates a web page having a share button. The share button should have information on the address of the conversation partner and the conversation partner address is used in forming the share button in the search result page.

When the search server does not generate a web page including a share button, the conversation partner address need not be included in the search request information, and search request information such as that shown in FIG. 13 may be generated.

Further, the search server may transmit the same search result page without distinguish if the search request is from the messenger or the search request is from the web browser. In this case, the identifier for indicating that the search request is from the messenger need not be included in the search request information and the search request information such as that shown in FIG. 14 may be generated.

Referring again to FIG. 11, when the search request information is generated, the messenger transmits the generated search request information to an address search server included in the search request information in step 708.

Figure 15:
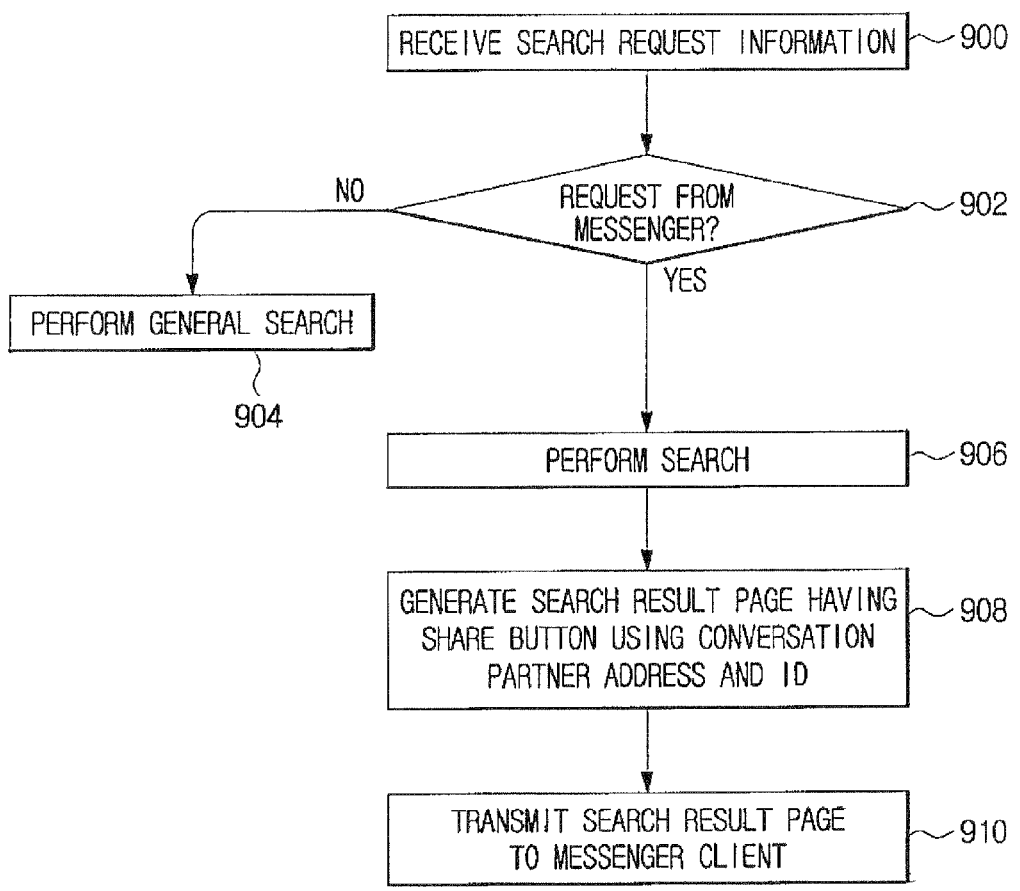
FIG. 15 illustrates a flow chart for operation of the search server that received search request information according to an embodiment of the present invention.

FIG. 15 illustrates a flow chart for operation of the search server that received search request information according to another embodiment of the present invention.

Referring to FIG. 15, the search server receives search request information from a messenger client in step 900.

The search server that received the search request information determines if the search request is from the messenger through the identifier of the search request information in step 902.

If the search request is not from the messenger, the search server performs a general search process in step 904.

If the search request is from the messenger, the search server performs a search by the keyword included in the search request information in step 906.

When search is completed, the search server generates a web page using the search results and inserts a share button to the web page in step 908. If the search request information from a messenger client includes a conversation partner address information, such as shown in FIG. 12, the conversation partner address is included in the share button.

The search server transmits the search result page including the share button to the messenger client step 910.

Figure 16:
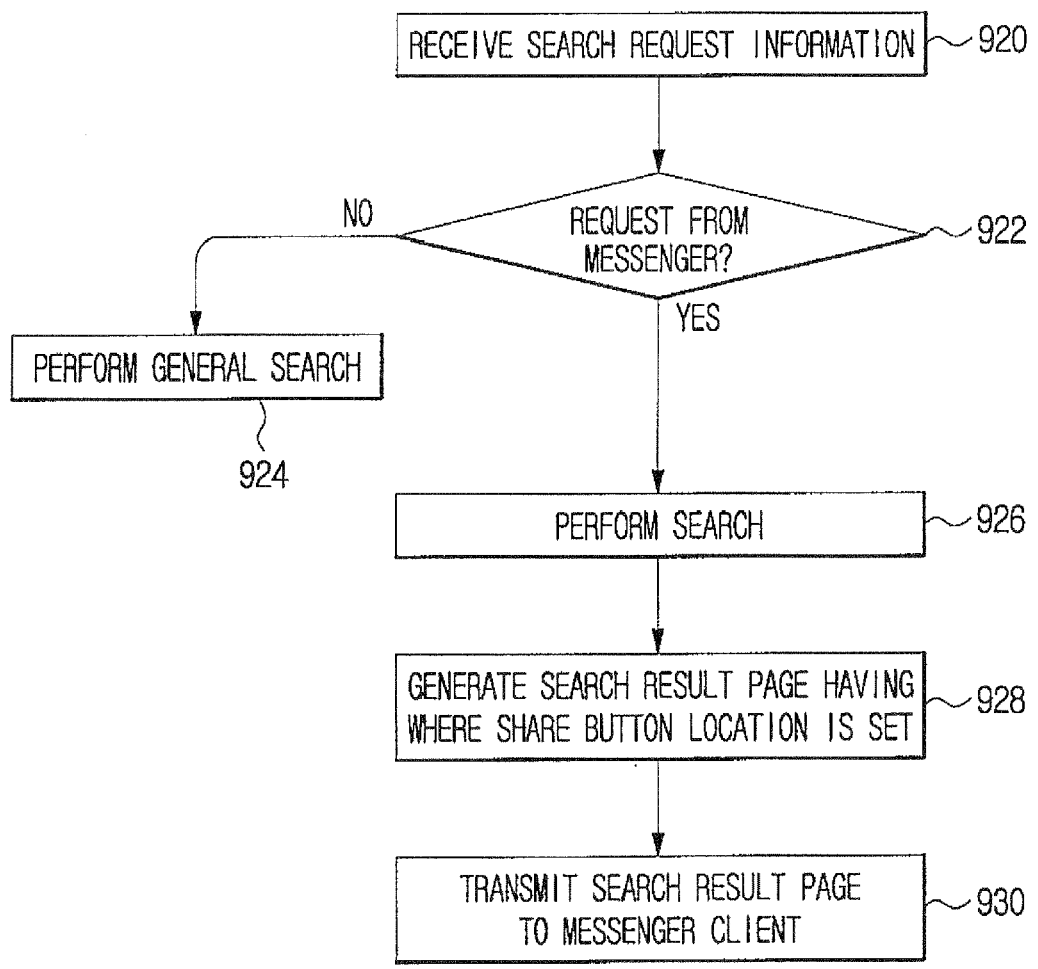
FIG. 16 illustrates a flow chart for operation of the search server that received search request information according to another embodiment of the present invention.

FIG. 16 illustrates a flow chart for operation of the search server that received search request information according to another embodiment of the present invention.

Compared with FIG. 15, the operation for generating a web page in step 928 is different from FIG. 15; however the other steps shown in FIG. 16 are similar to those shown in FIG. 15. In the embodiment shown in FIG. 16, search request information such as that shown in FIG. 13 is transmitted. Therefore, the search server cannot generate a web page with a share button including a conversation partner address. In this case, the search server does not complete the share button and generates HTML data including only location data of the share button. The HTML edition process where the conversation partner address is included in the share button is performed by the messenger client after the messenger client receives the web page.

Figure 17:
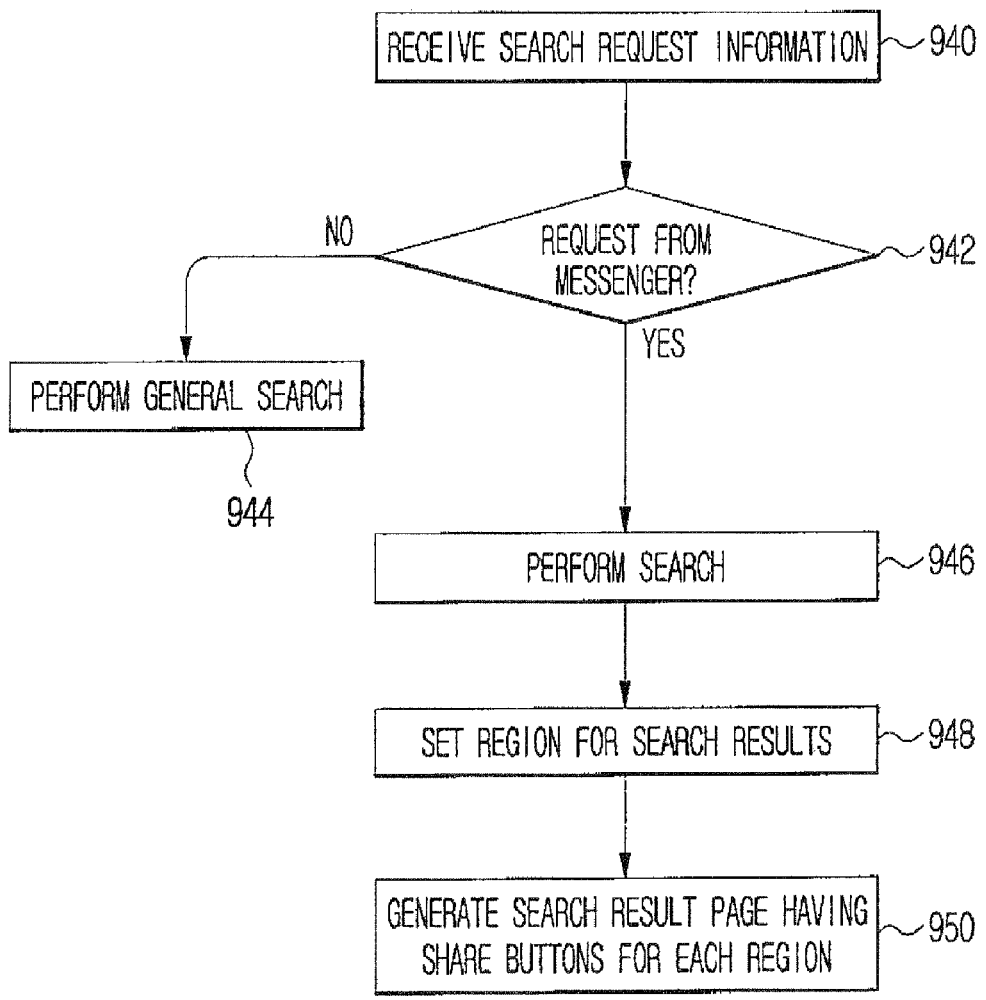
FIG. 17 illustrates a flow chart for operation of the search server that received search request information according to still another embodiment of the present invention.

FIG. 17 illustrates a flow chart for operation of the search server that received search request information according to still another embodiment of the present invention.

Referring to FIG. 17, the operation for generating a search result page in step 948 and step 950 is different from FIG. 15 and FIG. 16. FIG. 17 illustrates the case where the web page has an interface by which sharing of the search results can be requested for each of the search results independently.

In FIG. 17, after the search by keyword included in the search request information is completed in step 946, the search server sets each region corresponding to each of the search results in step 948. If the regions for each of the search results are set, a plurality of share buttons corresponding to each region are generated in step 950.

When share buttons are generated in the manner shown in FIG. 17, only the part of HTML data corresponding to region (s) covered by selected share button(s) is transmitted to the client of a conversation partner, and therefore, the search results can be shared for each of the search results.

Figure 18:
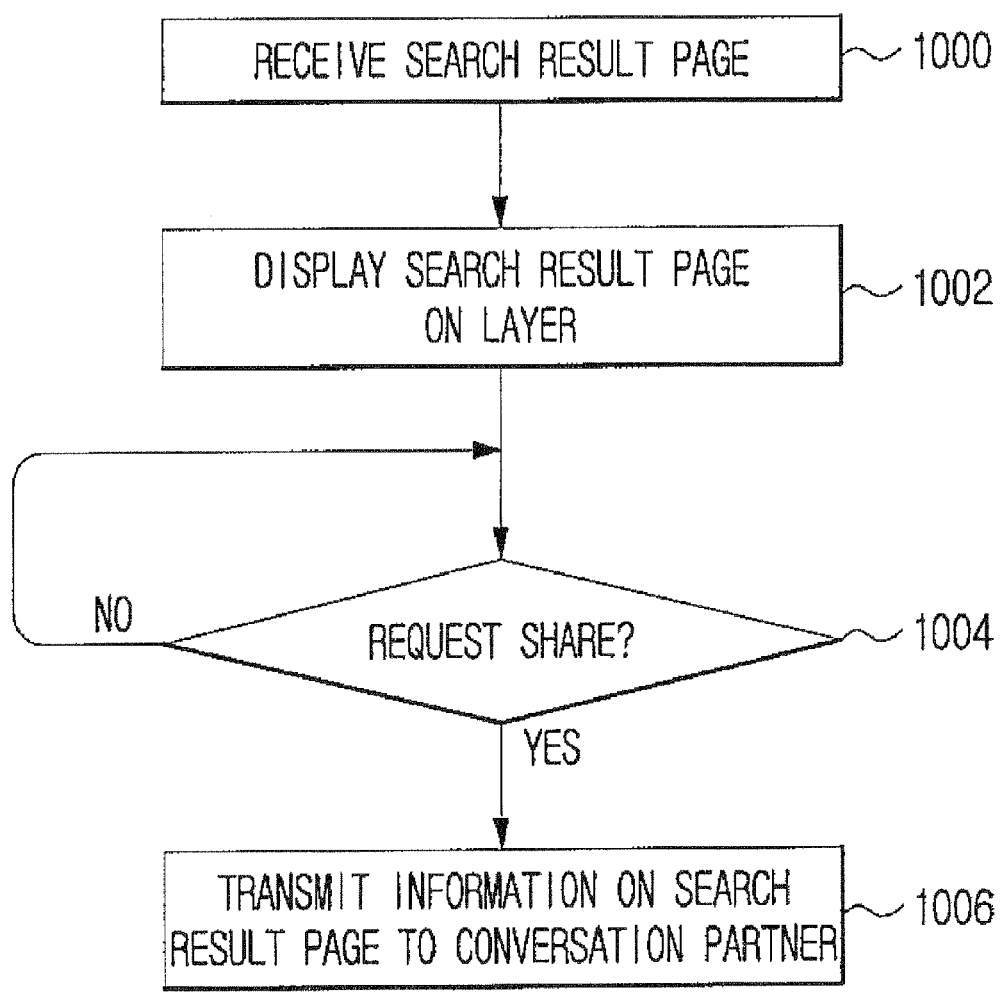
FIG. 18 illustrates a flow chart for operation of a messenger that received a search result page according to an embodiment of the present invention.

FIG. 18 illustrates a flow chart for operation of a messenger that received a search result page according to an embodiment of the present invention. Referring to FIG. 18, the messenger receives a search result page corresponding to search request information from the search server in step 1000. When the search result page is received, the messenger forms a layer coupled to a conversation window and displays the search result page in the formed layer in step 1002.

As described above, the layer is formed using an API having a web browser module, and the layer can display HTML data of the web page transmitted from the search server. When a user requests to share the search results using a share button included in the web page or a share button included in the messenger conversation window in step 1004, the messenger transmits information on the search result page displayed in the layer to the client of the conversation partner in step 1006.

As described above, the messenger may transmit only address information of the displayed web page, or the messenger may transmit HTML data of the web page. Although it is not shown in FIG. 18, if a user moves to another page using the search results, sharing of the moved web page is also possible. If one of the users in the conversation moves to another page using the search results and requests to share the moved page, the messenger transmits address information of the moved page or HTML data of the moved page to the client of the conversation partner so that the conversation partners can also see the same web page.

Figure 19:
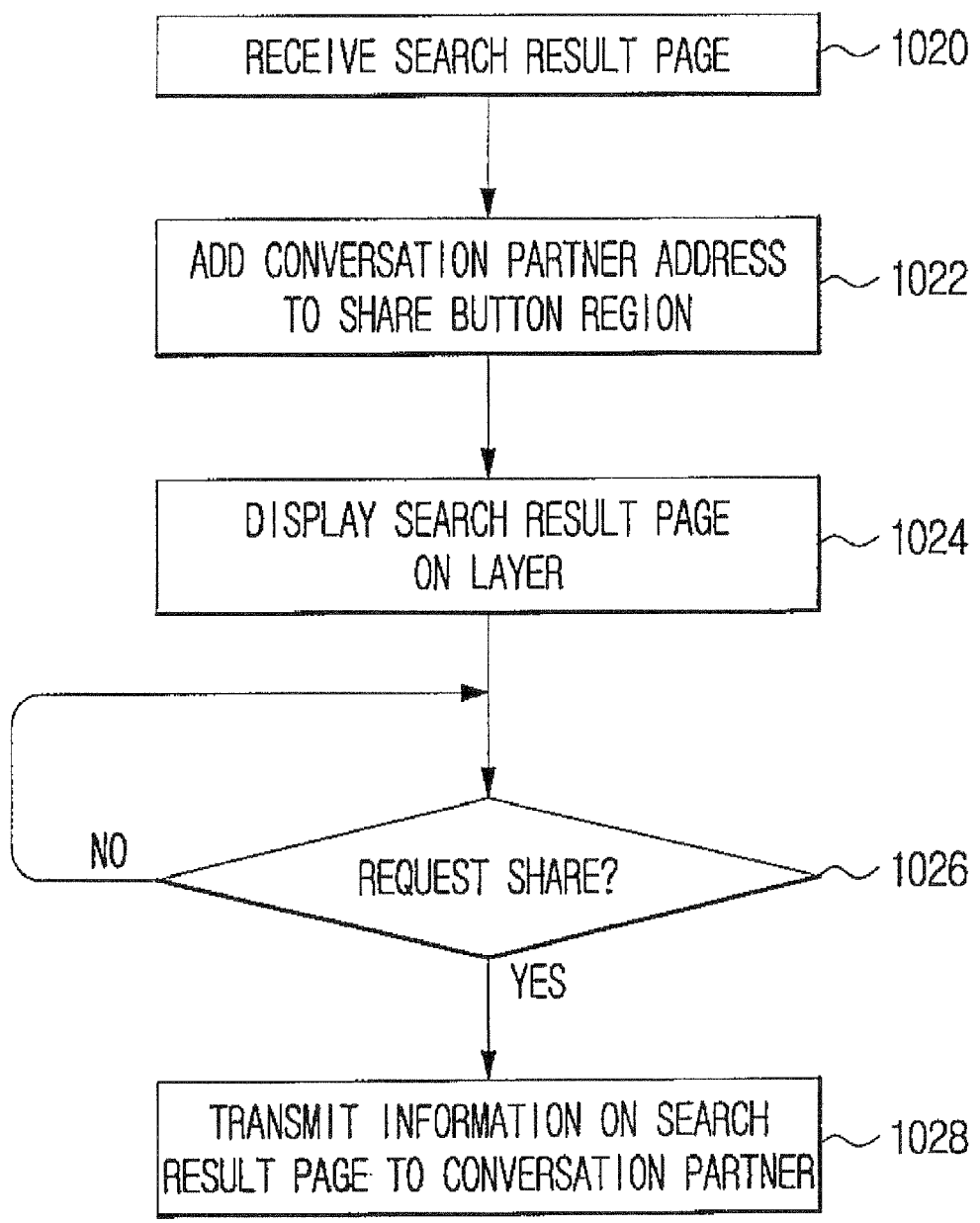
FIG. 19 illustrates a flow chart for operation of a messenger that received search result page according to another embodiment of the present invention.

FIG. 19 illustrates a flow chart for operation of a messenger that received search result page according to another embodiment of the present invention. Compared with FIG. 18, step 1022 is further included in the embodiment illustrated in FIG. 19. As described above, the search request information may not include the address of a conversation partner. In this case, the search server transmits a web page where only the location to which share button is inserted is set. When this web page is received, the messenger adds the address of the conversation partner and completes the web page, as shown in step 1022.

Figure 20:
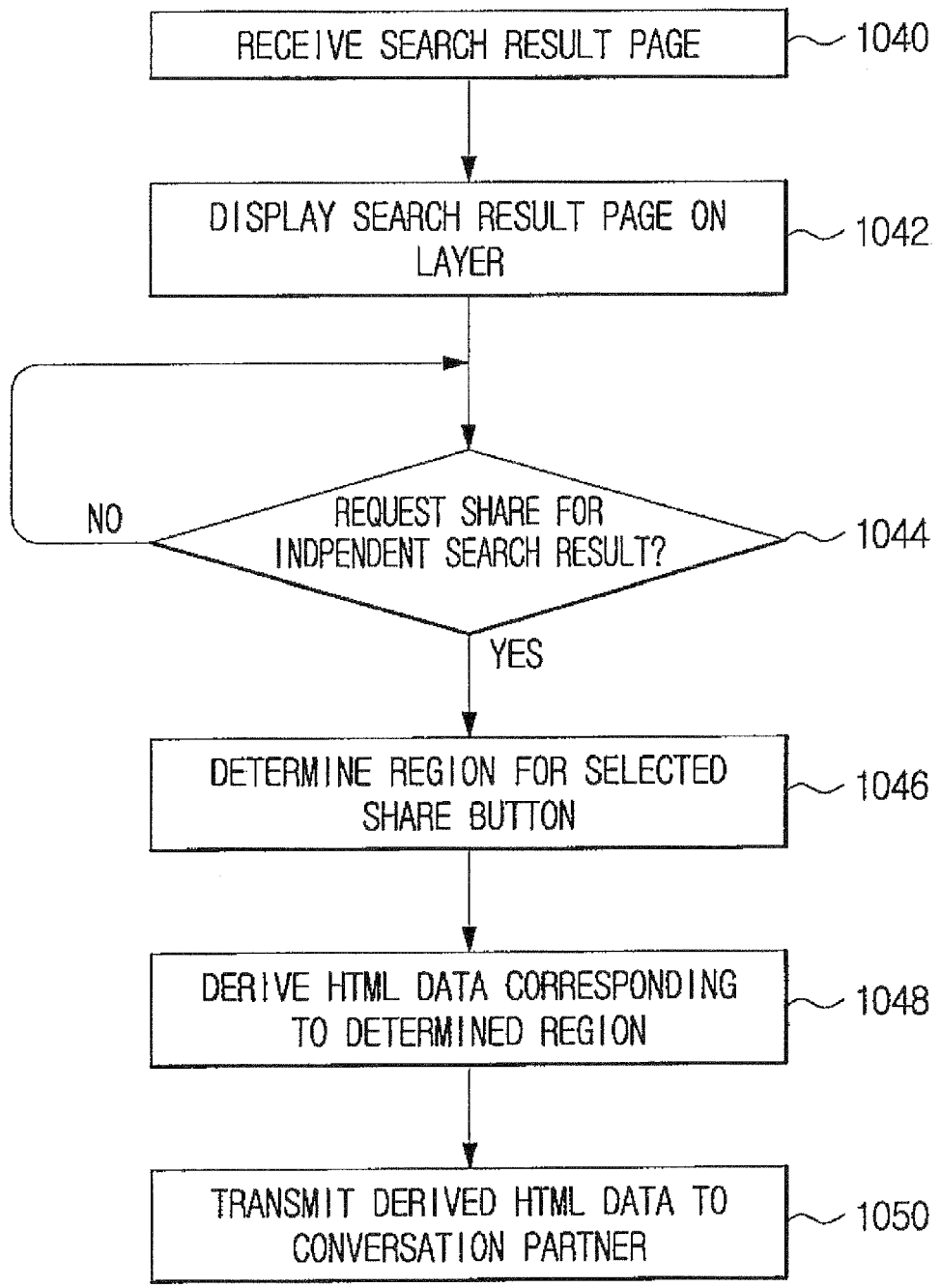
FIG. 20 illustrates a flow chart for operation of messenger that received search result page according to still another embodiment of the present invention.

FIG. 20 illustrates a flow chart for operation of messenger that received search result page according to still another embodiment of the present invention. FIG. 20 illustrates the case where sharing of search results is requested for each of the search results independently. In order to enable users to request sharing for each of the search results independently, a web page such as the one shown in FIG. 10 should be transmitted to the client.

If a user requests to share specified search results among the search results, a region covered by the share button that the user clicked is determined in step 1046. The information on the region covered by the share button is included in the web page data. If the region is determined, the messenger derives only the part of the HTML data corresponding to the region covered by the clicked share button in step 1048, and the derived data is transmitted to a client of a conversation partner in step 1050.

Since the accompanying drawings and the detailed description are only examples of the present invention, it is only for describing the present invention not for limiting the scope of the present invention. Therefore, those who skilled in the art will understand that many changes and equivalent embodiments can be made without departing from the scope of the present invention. Thus, the true scope of the present invention must be determined by the accompanying claims.

As described above, according to embodiments of the present invention, users can share search results by a specified keyword conveniently while messenger chatting. Therefore, messenger chatting and searching can be performed simultaneously and users need not copy any address of a web site and transmit it to a conversation partner like conventional messengers.

Further, according to the above-mentioned embodiments, users can see search results through a messenger, instead of through a web browser, and therefore users can see search results conveniently while messenger chatting. Furthermore, moved web page information using the search results can be also shared. According to other embodiments of the present invention, a messenger can provide not only conventional file sharing but also real time information sharing.

The invention claimed is:

1. A method for sharing search results using a messenger, the method comprising:

generating search request information using a keyword in response to receipt of a user request to search associated with the keyword;

transmitting the search request information to a search server, wherein the search server determines a location of a user interface to request sharing of search result and completes the user interface using address information of each conversation partner, and displays the search result where the user interface is included in the layer;

determining whether the search request is requested through the messenger or a general web browser, wherein a search result is selectively displayed to the messenger or the general web browser according to the determination and the search result is displayed through a layer coupled to a messenger window if the search request is requested through the messenger; and independently transmitting to one or more of conversation partners the search result comprising web page information displayed in the layer in response to receipt of a request to share the search result, wherein the search result and a conversation text are concurrently displayed to each of the conversation partners via the layer wherein the search result is formatted to conform either to a messenger of the respective conversation partners or to the general web browser, and wherein the formatted result is generated according to the determination and comprises defining a whole or a part of the search result that is selectively displayed to the one or more of the conversation partners according to a size of each messenger of the conversation partners.

2. The method of claim 1, wherein the layer is formed to each messenger of the conversation partners and the layer is coupled to each conversation window of each messenger of the conversation partners to display the web page.

3. The method of claim 1, wherein the search request information comprises an identifier to indicate whether the search request is generated from one of the messenger, a search server address, a keyword or a conversation partner address.

4. The method of claim 1, wherein the window provides a user interface to request sharing of the search result displayed in the layer.

5. The method of claim 1, wherein the web page information transmitted to one of the conversation partners is address information of the web page information displayed in the layer.

6. The method of claim 1, wherein the web page information transmitted to the conversation partners is Hyper Text Markup Language (HTML) data of the web page information displayed in the layer.

7. The method of claim 1, wherein the search server generates a search result comprising a user interface independently to request sharing of the search result with respect to each of the search results and selectively transmits the generated search result, and Hyper Text Markup Language (HTML) data corresponding to the search result requested to be sharing to one or more of the conversation partners.

8. The method of claim 7, wherein the user interface comprises the region covered by the user interface.

9. The method of claim 1, wherein the layer displaying the search result is formed using Application Program Interface (API) comprising web browser module.

10. The method of claim 1, further comprising:
in response to receipt of a user request to move a search result page to another web page displayed in the layer, displaying the web page requested to move in the layer; and
concurrently transmitting information of the web page to one or more of the conversation partners.

11. A non-transitory computer-readable storage medium comprising an executable program, which when executed, shares search results through a messenger by performing the following steps:
generating search request information using a keyword in response to receipt of a user request to search;
transmitting the search request information to a search server, wherein the search server determines a location of a user interface to request sharing of search result and completes the user interface using address information of each conversation partner, and displays the search result where the user interface is included in the layer;
determining whether the search request is requested through the messenger or a general web browser, wherein a search result is independently displayed to the messenger or the general web browser according to the determination, the display is performed through a layer coupled to a messenger window; and
transmitting information of the web page displayed in the layer to one or more of conversation partners, wherein the search results and texts are concurrently displayed to each of the conversation partners via the layer wherein the search results are formatted to conform either to a messenger of the respective conversation partners or to the general web browser, and wherein the formatted result is generated according to the determination and comprises defining a whole or a part of the search result that is selectively displayed to the one or more of the conversation partners according to a size of each messenger of the conversation partners.

12. The recorded medium of claim 11, wherein a messenger of the respective conversation partners forms a layer coupled to the conversation window of the messenger of the respective conversation partners to display the web page.

13. The recorded medium of claim 11, wherein the search request information comprises an identifier to indicate whether the search request is generated from one of the messenger, a search server address, a keyword or a conversation partner address.

14. The recorded medium of claim 11, wherein the information of the web page is address information of displayed web page.

15. The recorded medium of claim 11, wherein the information of the web page transmitted to the conversation partner is Hyper Text Markup Language (HTML) data of displayed web page.

* * * * *